(12) United States Patent  
Prociw et al.

(10) Patent No.: US 7,028,484 B2  
(45) Date of Patent: Apr. 18, 2006

(54) NESTED CHANNEL DUCTS FOR NOZZLE CONSTRUCTION AND THE LIKE

(75) Inventors: Lev Alexander Prociw, Elmira (CA); Harris Shafique, Longueuil (CA); John Sokalski, Greenfield Park (CA); Claude Raymond Pelletier, Varennes (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 10/231,334

(22) Filed: Aug. 30, 2002

(65) Prior Publication Data

US 2004/0040306 A1 Mar. 4, 2004

(51) Int. Cl.
*F02C 7/22* (2006.01)
*F23R 3/00* (2006.01)

(52) U.S. Cl. ............... 60/772; 60/734; 60/742; 285/124.1

(58) Field of Classification Search ............ 60/739, 60/742, 734, 772, 761; 239/450, 416.2, 416.3, 239/416.1; 285/124.1, 124.2; 138/115, 116, 138/117
See application file for complete search history.

(56) References Cited

U.S. PATENT DOCUMENTS

| | | | | |
|---|---|---|---|---|
| 1,321,976 A | * | 11/1919 | Brown ............... | 239/419.3 |
| 1,622,664 A | * | 3/1927 | Murray et al. ......... | 138/117 |
| 2,151,540 A | * | 3/1939 | Varga ................ | 138/117 |
| 2,591,880 A | * | 4/1952 | Sammons ............. | 60/736 |
| 2,946,185 A | * | 7/1960 | Bayer ................ | 60/765 |
| 3,213,523 A | * | 10/1965 | Boehler .............. | 29/890.11 |
| 3,472,025 A | * | 10/1969 | Simmons et al. ....... | 60/740 |
| 3,625,258 A | * | 12/1971 | Phelps ............... | 138/115 |
| 4,100,733 A | * | 7/1978 | Striebel et al. ....... | 60/737 |
| 4,322,945 A |   | 4/1982 | Peterson et al. |  |
| 4,404,806 A |   | 9/1983 | Bell, III et al. |  |
| 5,036,657 A |   | 8/1991 | Seto et al. |  |
| 5,253,471 A |   | 10/1993 | Richardson |  |
| 5,271,219 A |   | 12/1993 | Richardson |  |
| 5,396,759 A |   | 3/1995 | Richardson |  |
| 5,400,968 A |   | 3/1995 | Sood |  |
| 5,419,115 A |   | 5/1995 | Butler et al. |  |
| 5,423,178 A |   | 6/1995 | Mains |  |
| 5,570,580 A |   | 11/1996 | Mains |  |
| 5,579,645 A |   | 12/1996 | Prociw et al. |  |
| 5,598,696 A | * | 2/1997 | Stotts ............... | 60/779 |
| 5,765,360 A | * | 6/1998 | Schmidt et al. ....... | 60/260 |
| 5,771,696 A |   | 6/1998 | Hansel et al. |  |
| 5,848,525 A | * | 12/1998 | Spencer ............... | 60/739 |
| 5,956,955 A |   | 9/1999 | Schmid |  |
| 5,983,642 A | * | 11/1999 | Parker et al. ......... | 60/742 |
| 5,996,335 A |   | 12/1999 | Ebel |  |
| 6,109,038 A |   | 8/2000 | Sharifi et al. |  |
| 6,141,968 A |   | 11/2000 | Gates et al. |  |
| 6,149,075 A |   | 11/2000 | Moertle et al. |  |
| 6,240,732 B1 |   | 6/2001 | Allan |  |
| 6,256,995 B1 |   | 7/2001 | Sampath et al. |  |
| 6,463,739 B1 |   | 10/2002 | Mueller et al. |  |
| 6,761,035 B1 |   | 7/2004 | Mueller |  |
| 2003/0014979 A1 |   | 1/2003 | Summerfield et al. |  |

FOREIGN PATENT DOCUMENTS

| | | |
|---|---|---|
| CA | 1013153 | 7/1977 |
| CA | 2307188 | 5/1999 |

* cited by examiner

*Primary Examiner*—Ted Kim
(74) *Attorney, Agent, or Firm*—Ogilvy Renault

(57) ABSTRACT

A multiple conduit system for a gas turbine engine, the multiple conduit system extending between a plurality of conduit inlet and outlets. A channel is formed in a surface of a gas turbine engine component, and the channel is adapted for conveying a fluid flow from an inlet to an outlet. At least a first sealing member is disposed within the channel and divides the channel into at least a first discrete conduit and a second discrete conduit. A second sealing member encloses the channel to define the second discrete conduit. The first and second discrete conduits are each adapted to direct an independent fluid flow from respective inlets to respective outlets.

26 Claims, 4 Drawing Sheets

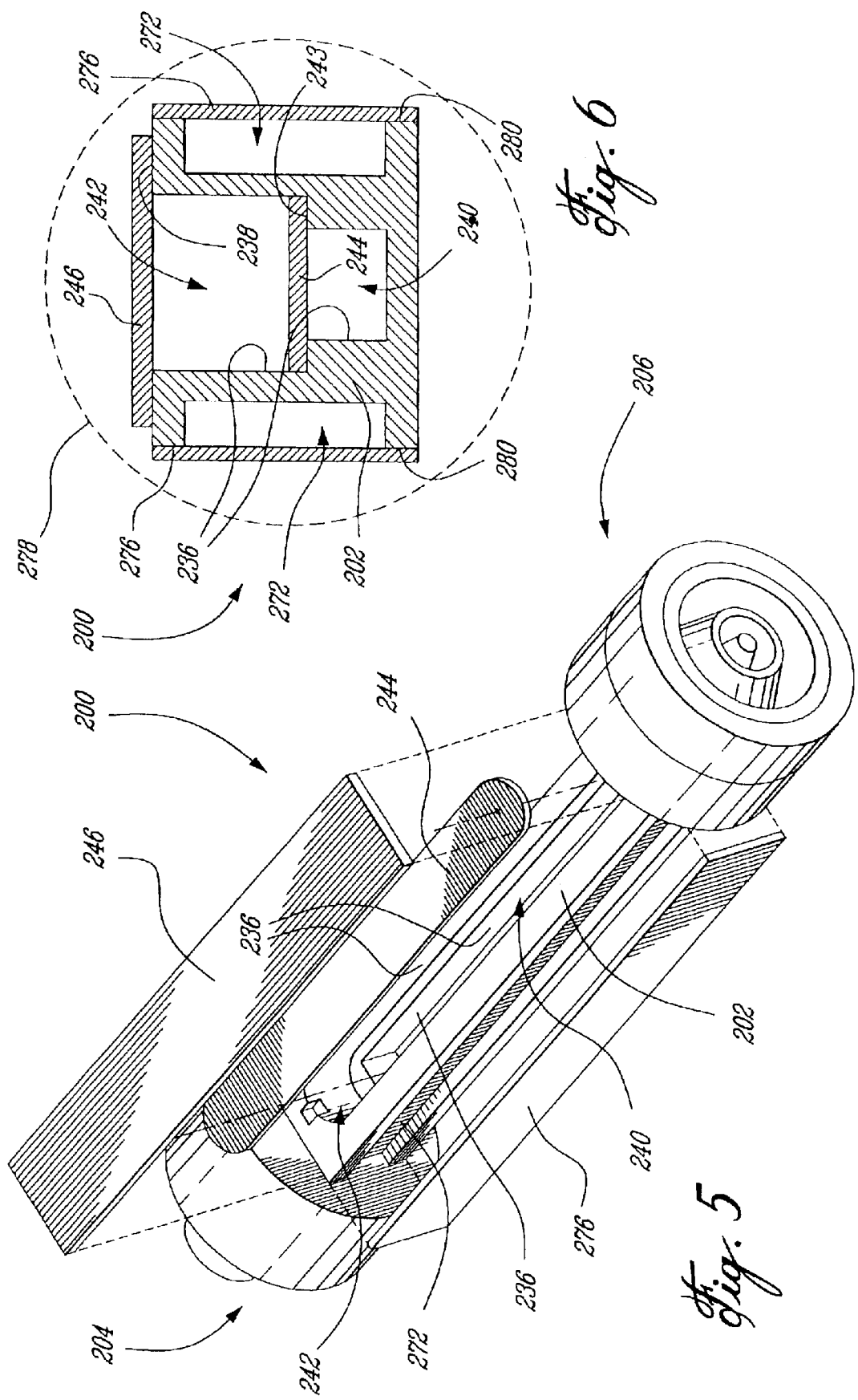

US 7,028,484 B2

NESTED CHANNEL DUCTS FOR NOZZLE CONSTRUCTION AND THE LIKE

TECHNICAL FIELD

The present invention relates generally to gas turbine engines, and more particularly to a nested channel configuration for use in fuel manifolds, nozzle stems and the like.

BACKGROUND OF THE INVENTION

Fuel nozzles which supply fuel to a combustion chamber in a gas turbine engine are well known in the art. Generally, a plurality of circumferentially distributed fuel nozzles forming a nozzle array in the combustion chamber are used to ensure sufficient distribution of the fuel. The fuel nozzle array typically comprises a plurality of injector tip assemblies for atomizing fuel into the combustion chamber, the injector tips being connected to an outer fuel manifold via nozzle stems.

Some conventional nozzle systems define duel adjacent fuel passages, sometimes concentrically disposed within an outer tube. In an effort to provide a dual passage stem member which is relatively simpler and more economical to manufacture, it is also known to use a stem comprised of a solid piece of material having adjacent slotted fuel conduits. The distinct slots, formed side by side, define primary and secondary fuel conduits extending between the inlet and outlet of the nozzle stem, and are sealed by a brazed cover plate.

Prior art multiple channel systems are cumbersome, difficult to manufacture and maintain, and heavy. Accordingly, improvements are desirable.

SUMMARY OF THE INVENTION

It is an object of the present invention to provide an improved fuel injection system that is simpler and more economical to manufacture.

It is a further object of the present invention to provide a fuel injection system that, among other things, eliminates the need for multiple independent fuel manifolds and for complex fuel nozzle stems.

Therefore, in accordance with the present invention, there is provided a gas turbine engine fuel nozzle having a spray tip assembly in flow communication with a fuel source, the fuel nozzle comprising: a fuel-conveying member comprising a stepped channel formed in a surface of the fuel-conveying member for providing fuel flow to the spray tip assembly; at least a first inner sealing plate being disposed within the stepped channel and dividing the stepped channel into at least a primary and a secondary discrete nested conduit; and an outer sealing plate being engaged with the surface for enclosing the stepped channel; whereby each discrete nested conduit is adapted for directing an independent fuel flow from the fuel source to the spray tip assembly.

There is also provided, in accordance with the present invention, a method of manufacturing a gas turbine engine fuel nozzle having multiple discrete fuel conduits for directing independent fuel flows from a fuel source to a spray tip assembly, the method comprising: providing a fuel-conveying member formed from a single solid piece of material; machining a single stepped channel in a surface of the fuel-conveying member, the stepped channel defining at least primary and secondary nested slots, the secondary slot defining a larger cross-sectional area than the primary slot and being immediately open to the surface; fixing at least a first inner sealing plate having a width greater than a width of the primary slot, within the secondary slot with the first inner sealing plate abutting a shoulder formed by the stepped channel, thereby dividing the stepped channel into a primary discrete nested fuel conduit and the nested secondary slot; and fixing an outer channel sealing plate to the fuel-conveying member to enclose the secondary slot thereby forming a secondary discrete nested fuel conduit.

BRIEF DESCRIPTION OF THE DRAWINGS

Further features and advantages of the present invention will become apparent from the following detailed description, taken in combination with the appended drawings, in which:

FIG. 5 is a perspective view of a second embodiment of a fuel injection system according to the present invention comprising a fuel nozzle stem having nested fuel channels formed therein.

FIG. 6 is a cross-sectional view of the nested channel fuel nozzle stem of FIG. 5.

DETAILED DESCRIPTION OF THE PREFERRED EMBODIMENT

Figure 1:
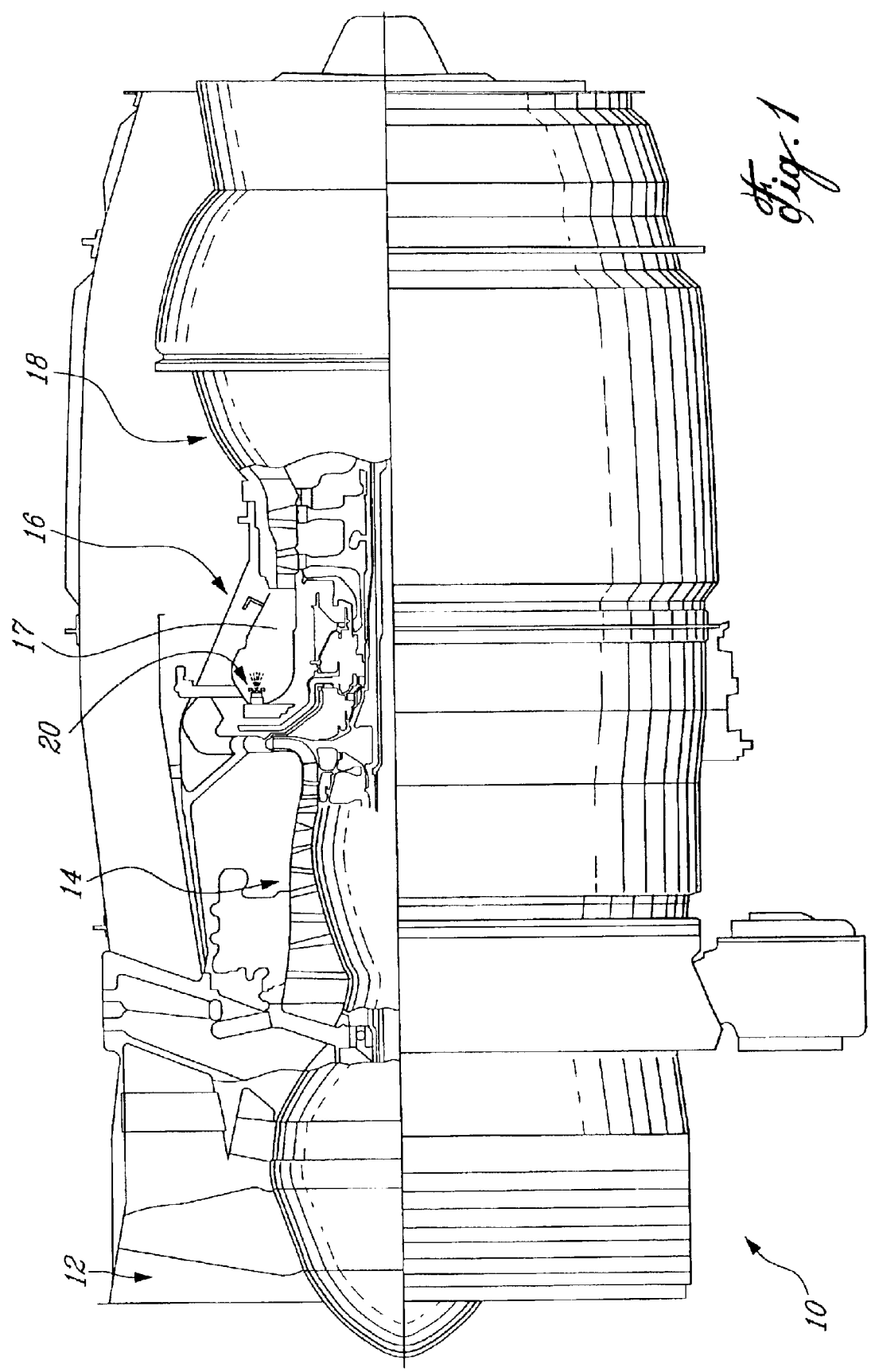
FIG. 1 is a cross-sectional view of a gas turbine engine comprising a fuel injection system according to the present invention.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized into a combustion chamber 17 by a fuel injection system comprising a fuel injection nozzle assembly 20, the mixture being subsequently ignited for generating hot combustion gases before passing through a turbine section 18 for extracting energy from the combustion gases.

Figure 2:
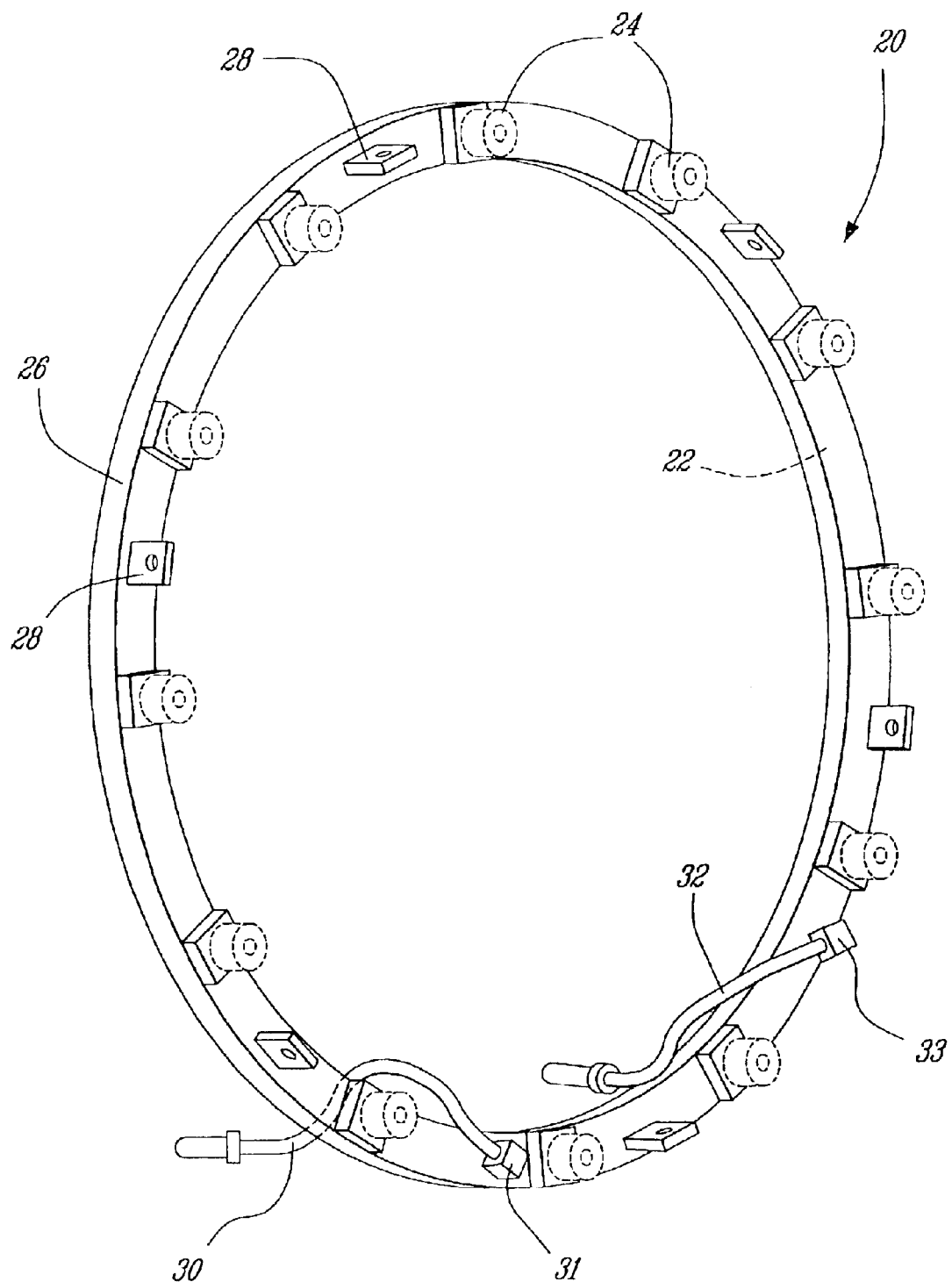
FIG. 2 is a perspective view of a first embodiment of a fuel injection system according to the present invention comprising an annular, nested channel fuel manifold ring.

Referring to FIG. 2, the fuel injection nozzle assembly 20 comprises an annular fuel manifold ring 22 generally disposed within the combustion chamber 17 of the engine, and mounted via several integral attachment lugs 28 for fixing the annular ring 22 to an appropriate support structure. The annular fuel manifold ring 22 comprises a plurality of fuel injector spray tip assemblies 24 thereon, which atomize the fuel for combustion. The exterior of the annular ring 22 comprises an outer heat shield 26 covering the ring. This provides the fuel manifold ring thermal protection from the high temperature environment of the combustion chamber. A primary fuel inlet pipe 30 and a secondary fuel inlet pipe 32 provide dual, independent fuel feeds to the manifold, which distributes the two fuel supplies to the spray tip assemblies. The spray tip assemblies 24 are directly mounted to the annular fuel manifold ring, without requiring conventionally used nozzle stems which are traditionally required to link, in fluid flow communication, the spray tip assemblies with each distinct fuel manifold for each fuel inlet source. The above features are generally known in the art.

Figure 3:
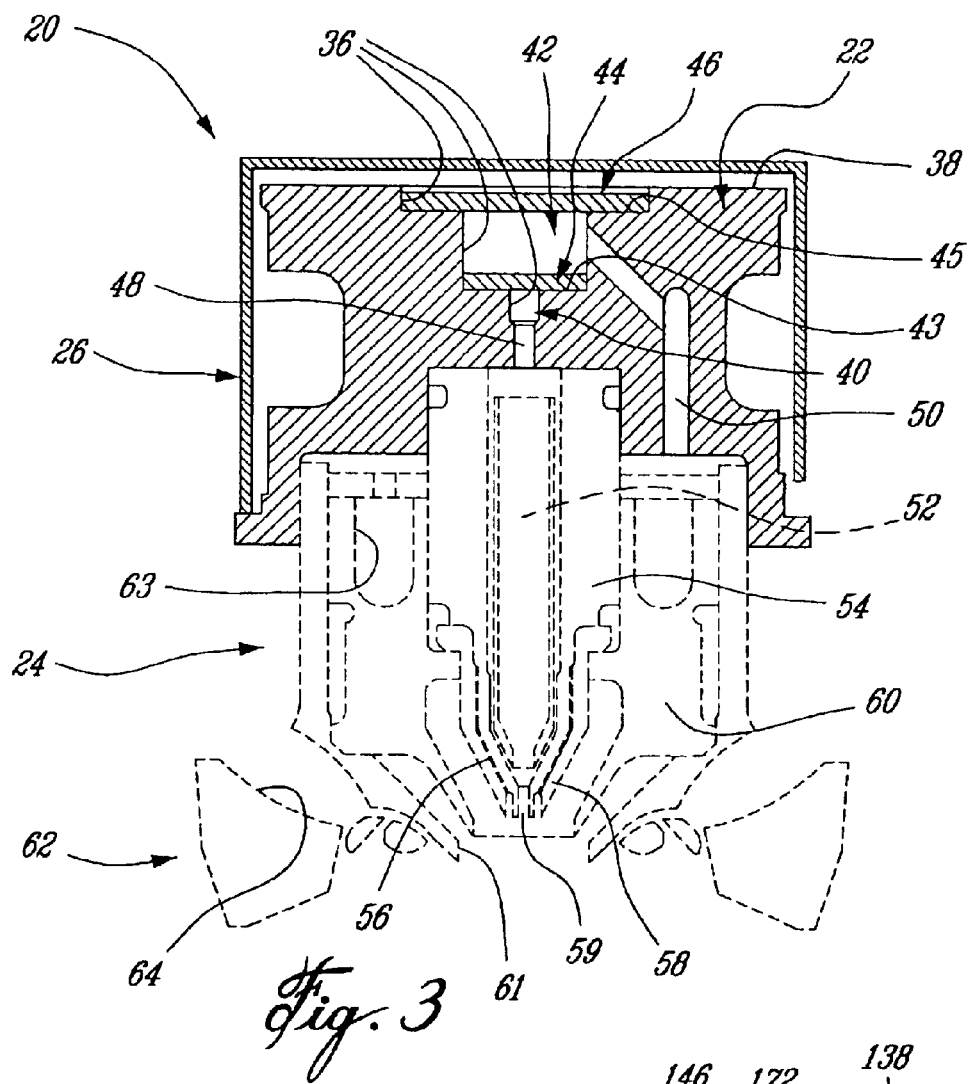
FIG. 3 is a cross-sectional view of the nested channel fuel manifold ring of FIG. 2.

Referring now to FIG. 3 more clearly showing the details of the fuel injection nozzle assembly 20 according to the present invention, the annular fuel manifold ring 22 is preferably formed from a single solid piece of material and comprises a single stepped channel 36 formed in an outer peripheral surface 38 of the manifold ring which is covered by a protective outer heat shield 26. The stepped channel 36 is preferably formed by a single machining operation, for example by a single milling or routing step using a multi-diametered bit of a predetermined size to create the number and size of the nested slots comprising the entire stepped channel 36. Once provided, as described below, the nested slots, defined by the stepped slot that is machined, or otherwise formed, in the fuel manifold ring, create annular fuel galleries which permit circumferential distribution of independently controllable fuel supplies to be fed to each spray tip assembly. The channel 36 has a length which is defined as the circumferential length or circumference of the channel.

The annular stepped channel 36 comprises at least two nested fuel conduits; namely a primary nested fuel conduit 40 and secondary nested fuel conduit 42. The annular primary fuel conduit is located in the manifold ring closest to the spray tip assemblies, and preferably (to facilitate manufacture) is much smaller in cross-sectional area than the annular secondary nested fuel conduit 42, which opens immediately to the peripheral surface 38 in which the stepped channel 36 is formed. A first inner sealing member or plate 44, sized such that it fits within the secondary conduit portion of the stepped channel and is larger than the width of the primary conduit (i.e. to seal it), is fixed against a first shoulder 43 formed in the stepped channel between the primary and secondary nested conduits, by way of brazing or another fastening/sealing method. The first inner sealing plate 44 for the annular fuel manifold ring 22, is preferably also an annular ring plate, substantially extending around the full circumference of manifold ring. An outer stepped channel sealing member or plate 46 is similarly fixed to the fuel manifold ring 22 by brazing or other similar fastening method, against a second shoulder 45 formed within the stepped channel for receiving the annular outer sealing plate ring 46 abutted therein. The outer sealing ring plate 46 could also be brazed directly to the outer peripheral surface 38 of the manifold ring, without the need for the second shoulder 45 in the stepped channel 36. The two sealing plates thereby divide the single stepped channel 36 into two discrete, nested fuel conduits that are sealed from one another and which can supply independent fuel supplies to the spray tip assemblies, primary nested fuel conduit 40 and secondary nested fuel conduit 42. This therefore permits the use of a single-piece fuel manifold, having at least two discrete fuel galleries formed therein in a simple and cost effective manner. This eliminates the need for employing fuel nozzle stems and conventional fuel nozzle injector arrays comprising hundreds of sub-components merely to connect an exteriorly located fuel manifold to the spray tip assemblies in the combustion chamber.

The primary and secondary annular nested fuel conduits 40 and 42 permit circumferential distribution of the primary and secondary fuel supply around the fuel manifold ring. At the location of each spray tip assembly 24 mounted to the annular manifold ring 22, fuel outlet passage holes are formed, by drilling or otherwise, in the manifold ring body substantially perpendicularly to the outer peripheral surface 38, to enable fluid flow communication between the nested fuel conduits and the spray tip assembly 24. Specifically, primary fuel conduit outlet passage 48 permits primary fuel flow from the primary fuel conduit 40 to be fed into the primary distributor 54 of the spray tip assembly, and secondary fuel conduit outlet passage 50 permits secondary fuel flow from the secondary fuel conduit 42 to be fed into the annular secondary fuel swirling cavity 63 of the spray tip assembly 24.

Such spray tip assemblies typically also comprise a valve member 52 disposed within the primary distributor 54 for regulating primary fuel flow through a primary cone 56, protected by a primary heat shield 58, before being ejected by a primary fuel nozzle tip 59. A secondary fuel swirler 60 disposed substantially concentrically about the primary distributor, comprises an annular secondary fuel swirling cavity, which swirls the secondary fuel flow before it is ejected through annular secondary fuel nozzle tip 61. An outer air swirler 62 comprises a plurality of circumferentially spaced air passages 64 which convey air flow for blending with the primary and secondary fuel sprays issuing from the primary and secondary spray orifices, 59 and 61 respectively, of the spray tip assembly.

Figure 4:
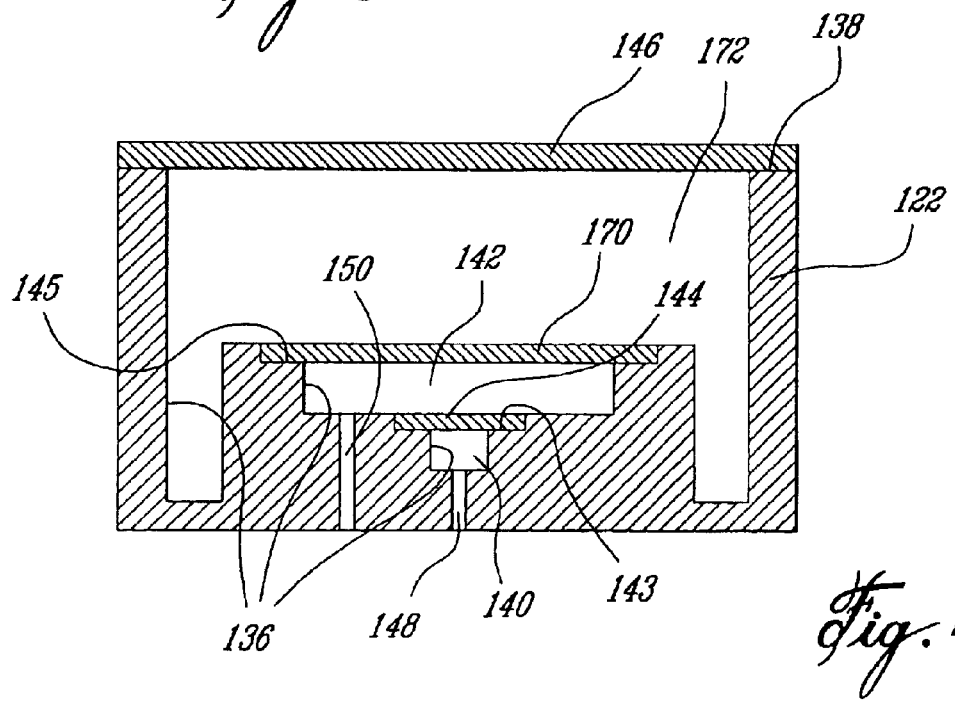
FIG. 4 is a cross-sectional view of an alternate fuel manifold ring having an additional nested channel.

Referring to FIG. 4, this embodiment of an annular fuel manifold ring 122 comprises an alternately-shaped stepped channel 136 machined in the solid, one-piece material of the manifold ring. The stepped channel 136 comprises an additional or auxiliary channel 172, therein. As above, a primary nested fuel conduit 140 is formed by fixing the first inner annular sealing member or plate 144 against a first shoulder 143, thereby dividing the primary fuel conduit 140 from the secondary nested fuel conduit 142. The secondary nested fuel conduit 142 is enclosed by a second inner sealing member or plate 170 abutted with, and fixed against, second shoulder 145 within the stepped channel 136. As described above, although several attachment and sealing methods for fixing the sealing plates to the manifold ring can be used, they are preferably brazed thereto. The annular auxiliary channel 172 is further axially enclosed by an outer sealing member or plate 146, fixed against the outer peripheral surface 138 of the annular fuel manifold ring 122. As described above, a primary conduit outlet passage 148 and a secondary conduit outlet passage 150, formed in the manifold ring perpendicularly to the outer peripheral surface 138 at predetermined circumferential locations of the manifold ring corresponding to location of the spray tip assemblies, provide dual independent fuel feeds to each spray tip assembly.

The auxiliary channel 172 can be used to carry a coolant, such as for example recirculated fuel, which will draw heat from the ring. The coolant flow in the auxiliary channel 172 is independent of the quantity of fuel being delivered to the engine. This is particularly needed during low power operation, when less fuel flows through the conduits of the manifold, and therefore more heat is absorbed from the combustion chamber by the entire manifold ring. This reduces fuel coking within the fuel manifold, which can occur if sufficient fuel flow is not maintained to cool the manifold ring. Each conduit, namely the primary fuel conduit 140), the secondary fuel conduit 142 and the auxiliary cooling conduit 172, each has its own inlet feed line, such that the fuel rates and the coolant flow rate can be independently controlled. Independent control of the primary and secondary fuel flows and independent feeding of each spray tip from the annular conduits providing circumferential fuel distribution, also permits fuel staging, wherein specific amounts of fuel are partitioned to specific circumferential locations of the combustion chamber to enhance ignition or to control emissions.

The present invention may also be used to provide multiple nested channels for providing discrete fuel conduits in a fuel nozzle stem.

Referring to FIG. 5 and FIG. 6, a fuel nozzle stem 200 comprises a central stem body 202 and a stem inlet end 204 and a stem outlet end 206. A stepped channel 236 is formed in a first outer surface 238 of the stem body 202. The channel is divided by an inner sealing member or plate 244, abutted with, and preferably brazed to, shoulder 243 within the stepped channel, thereby defining a primary nested fuel conduit 240 and a preferably larger secondary nested fuel conduit 242. Unlike the nested fuel conduits described previously, the primary and secondary conduits 240 and 242 are substantially linear, rather than being annular. Therefore the channel 236 has a length which is defined as the linear or longitudinal length. The secondary nested fuel conduit 242 is enclosed by an outer sealing member or plate 246, preferably fixed to the outer surface 238 of the stem body, again preferably by brazing. The primary and secondary fuel conduits thereby provide discrete fuel flow passages between the inlet end 204 and the outlet end 206 of the stem, which are adapted to be engaged with a fuel manifold adapter and a nozzle spray tip assembly, respectively. This permits at least two discrete fuel flows through the nozzle stem to a spray tip assembly. Typically, the entire fuel nozzle stem 200 is fitted within a surrounding cylindrical outer shield 278, which is can be brazed to the stem member to provide an element of heat protection. The stem body 202 can also comprise auxiliary cooling channels 272 formed therein according to the present invention. In the example shown, the auxiliary cooling channels 272 are on opposing sides of the stem body in outer lateral surfaces 280 of the stem body, substantially perpendicular to the first outer surface 238 with the stepped channel 236 formed therein. Auxiliary channel outer sealing plates 273 enclose the auxiliary cooling channels. The two opposing auxiliary coolant channels 272 are in fluid flow communication at the outlet end 206 of the stem, such that they can provide inlet and outlet passages for coolant flowing through to stem to provide cooling thereof.

While the above description constitutes the preferred embodiments, it will be appreciated that the present invention is susceptible to modification and change without departing from the fair meaning of the accompanying claims. For example, the present invention can offer reliability and weight benefits in any gas turbine engine application wherever multiple hydraulic or other fluid conduits are required or desired. Also, the stepped construction of the channel is preferred, but other configurations will be apparent to those skilled in the art. Still other modifications and applications beyond those described will be apparent to those skilled in the art.

What is claimed is:

1. A gas turbine engine fuel nozzle system having a spray tip assembly in flow communication with a fuel source, the fuel nozzle system comprising;
    a fuel-convoying member comprising a channel formed therein for providing fuel flow to the spray tip assembly, the channel having a length and defining at least one shoulder therein along the length, the shoulder corresponding to a change in width of the channel;
    at least a first inner sealing member disposed within the channel and mounted to the shoulder substantially along said length, the first inner sealing member dividing the channel into at least a primary discrete conduit and a secondary discrete conduit; and
    an outer sealing member for enclosing the channel substantially along its length to define the secondary discrete conduit;
    whereby each discrete conduit is adapted for directing an independent fuel flow from the fuel source to the spray tip assembly.

2. The fuel nozzle system as defined in claim 1, wherein the fuel-conveying member is an annular fuel manifold ring and the channel is defined therearound.

3. The fuel nozzle system as defined in claim 2, wherein the annular fuel manifold ring feeds a plurality of the spray tip assemblies directly engaged thereto.

4. The fuel nozzle system as defined in claim 1, wherein the channel is stepped by reason of the presence of the shoulder, and wherein the first inner sealing member abuts the shoulder.

5. The fuel nozzle system as defined in claim 1, wherein the outer sealing member is engaged to an outer surface of the fuel-conveying member in which the channel is formed.

6. The fuel nozzle system as defined in claim 1, wherein the secondary discrete conduit has a larger cross-sectional area than the primary discrete conduit.

7. The fuel nozzle system as defined in claim 1, wherein the fuel-conveying member includes a third discrete conduit in the channel.

8. The fuel nozzle system as defined in claim 7, wherein the third discrete conduit is nested with the primary and secondary discrete conduits within the channel, and is sealing divided from the secondary discrete conduit by a second inner sealing member disposed within the channel.

9. The fuel nozzle system as defined in claim 7, wherein the third discrete conduit is defined by at least an auxiliary channel formed in the fuel-conveying member separately from the channel, and covered by at least an auxiliary outer sealing member.

10. The fuel nozzle system as defined in claim 7, wherein two opposing auxiliary channels are formed in the fuel-conveying member parallel to but outside said channel.

11. The fuel nozzle system as defined in claim 1, wherein the fuel-conveying member is provided in a single solid piece of material.

12. The fuel nozzle system as defined in claim 1, wherein the first inner sealing member and the outer sealing member are brazed to the fuel-conveying member.

13. The fuel nozzle system as defined in claim 1, wherein the fuel-conveying member is a fuel nozzle stem.

14. The fuel nozzle system as defined in claim 13, wherein the channel extends linearly along a portion of an axial length of the fuel stem member.

15. A multiple conduit system for a gas turbine engine, the multiple conduit system extending between a plurality of conduit inlet and outlets, the system comprising:
    a channel formed in a surface of a gas turbine engine component, the channel having a length and defining at least one shoulder therein along the length, the shoulder corresponding to a change in width of the channel, the channel being adapted for conveying a fluid flow from an inlet to an outlet;
    at least a first sealing member disposed within the channel and mounted to the shoulder substantially along said length, the first sealing member dividing the channel into at least a first discrete conduit and a second discrete conduit; and
    a second sealing member enclosing the channel substantially alone its length to define the second discrete conduit;
    whereby the first and second discrete conduits are each adapted to direct an independent fluid flow from respective inlets to respective outlets.

16. The multiple conduit system of claim 15, wherein the channel is stepped by reasons of the presence of the shoulder, and wherein the first sealing member abuts the shoulder.

17. The multiple conduit system of claim 15, wherein the second sealing member engages the surface of the gas turbine engine component.

18. A method of manufacturing a gas turbine engine fuel nozzle having multiple discrete fuel conduits for directing independent fuel flows from a fuel source to a spray tip assembly, the method comprising:
providing a fuel-conveying member;
providing a channel in a surface of the fuel-conveying member;
providing a shoulder in the channel along a length of the channel, the shoulder corresponding to a change in width of the channel;
fixing at least a first sealing member into the channel against the shoulder substantially along said length to divide the channel into a first discrete fuel conduit and a second discrete fuel conduit;
and fixing a second sealing member to the fuel-conveying member substantially along said length to enclose the channel and thereby define the second discrete fuel conduit.

19. The method as defined in claim 18, further comprising providing the fuel-conveying member from a solid piece of material.

20. A gas turbine engine fuel nozzle system having a spray tip assembly in flow communication with a fuel source, the fuel nozzle system comprising:
a fuel-conveying member comprising a channel formed in a peripheral surface thereof and-defining an opening in the peripheral surface;
at least a first inner sealing member receivable within the channel, the first inner sealing member being mounted therewithin substantially along the channel to sealingly divide the channel into nested primary and secondary discrete conduits, the primary discrete conduit being defined between a bottom of the channel and the inner sealing member and being narrower than the secondary conduit;
an outer sealing member fastenable to the fuel-conveying member for enclosing the channel; and
whereby each discrete conduit is adapted for directing fuel flow from the fuel source to the spray tip assembly.

21. The fuel nozzle system as defined in claim 20, wherein the secondary discrete conduit is defined between the inner sealing member and the outer sealing member.

22. The fuel nozzle system as defined in claim 20, wherein the first inner sealing member is insertable into the channel through said opening.

23. A multiple conduit system for a gas turbine engine, the multiple conduit system extending between a plurality of conduit inlet and outlets, the system comprising:
a channel formed in a peripheral surface of a gas turbine engine fluid-conveying component, the channel defining an opening in the peripheral surface;
at least a first inner sealing member receivable within the channel, the first inner sealing member being mounted therewithin substantially along the channel to sealingly divide the channel into nested first and second discrete conduits, the first discrete conduit being defined between a bottom of the channel and the first inner sealing member and being narrower than the second conduit;
an outer sealing member fastenable to the fluid-conveying component for enclosing the channel; and
the first and second discrete conduits each providing independent fluid flow communication from the respective inlets to the respective outlets.

24. The multiple conduit system as defined in claim 23, wherein the second discrete conduit is defined between the first inner sealing member and the outer sealing member.

25. The multiple conduit system as defined in claim 23, wherein the first inner sealing member is insertable into the channel through the opening.

26. A method of manufacturing a gas turbine engine fuel assembly having multiple discrete fuel conduits for directing independent fuel flows from a fuel source to a spray tip assembly, the method comprising:
providing a fuel-conveying member;
forming a channel in a peripheral surface of the fuel-conveying member, the channel defining an opening in a peripheral surface;
inserting at least a first inner sealing member into the channel through the opening, and mounting the inner sealing member within the channel substantially alone a length of the channel to sealingly divide the channel into nested first and second discrete fuel conduits; and
mounting an outer sealing member to the fuel-conveying member to enclose the channel substantially along a length of the channel, the first discrete fuel conduit being defined between a bottom of the channel and the inner sealing member.

* * * * *

UNITED STATES PATENT AND TRADEMARK OFFICE
CERTIFICATE OF CORRECTION

PATENT NO. : 7,028,484 B2  Page 1 of 1
APPLICATION NO. : 10/231334
DATED : April 18, 2006
INVENTOR(S) : Lev Alexander Prociw et al.

It is certified that error appears in the above-identified patent and that said Letters Patent is hereby corrected as shown below:

In the claims:

Claim 26, column 8, line 41, delete "alone" and insert --along--.

Signed and Sealed this

Eleventh Day of July, 2006

JON W. DUDAS
*Director of the United States Patent and Trademark Office*